(12) United States Patent
Goh et al.

(10) Patent No.: US 6,636,374 B1
(45) Date of Patent: Oct. 21, 2003

(54) INTELLIGENT SPEED MONITORING AUTO RETRACT SYSTEM

(75) Inventors: Ban Hok Goh, Singapore (SG); Nan Ling Goh, Singapore (SG); Tze Ming Jimmy Pang, Singapore (SG); Kah Liang Gan, Singapore (SG); LaiKein James Chang, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/556,887

(22) Filed: Apr. 19, 2000

Related U.S. Application Data
(60) Provisional application No. 60/130,304, filed on Apr. 21, 1999.

(51) Int. Cl.[7] .............................................. G11B 21/02
(52) U.S. Cl. ...................................................... 360/75
(58) Field of Search .......................... 360/78.06, 73.06, 360/73.08, 75, 78.04, 78.09

(56) References Cited

U.S. PATENT DOCUMENTS

| | | | |
|---|---|---|---|
| 4,371,903 A | * | 2/1983 | Lewis ........................... 360/75 |
| 4,462,053 A | * | 7/1984 | Lum et al. ............... 360/78.06 |
| 4,786,995 A | | 11/1988 | Stupeck et al. |
| 4,807,062 A | | 2/1989 | Onodera |
| 4,866,554 A | | 9/1989 | Stupeck et al. |
| 5,353,174 A | * | 10/1994 | Uno ........................ 360/78.06 |
| 5,428,590 A | * | 6/1995 | Ofino ....................... 369/44.28 |
| 5,504,402 A | * | 4/1996 | Menegoli ..................... 318/377 |
| 5,666,236 A | * | 9/1997 | Bracken et al. ............... 360/75 |
| 5,768,045 A | * | 6/1998 | Patton, III et al. ......... 360/78.04 |
| 5,949,608 A | * | 9/1999 | Hunter ..................... 360/78.09 |
| 6,064,539 A | * | 5/2000 | Null et al. ..................... 360/75 |
| 6,154,340 A | * | 11/2000 | Cameron ..................... 360/75 |
| 6,476,996 B1 | * | 11/2002 | Ryan ........................... 360/75 |

FOREIGN PATENT DOCUMENTS

| | | |
|---|---|---|
| GB | 2 290 630 A | 1/1996 |
| JP | 08275579 A | 3/1995 |

* cited by examiner

*Primary Examiner*—David Hudspeth
*Assistant Examiner*—Fred F. Tzeng
(74) *Attorney, Agent, or Firm*—David K. Lucente; Derek J. Berger

(57) ABSTRACT

A system for hardware intelligent speed monitoring and auto-retract is disclosed. The system contains a monitoring device that monitors the TACH (Tachometer) output of motor driver. The device provides a trigger to the signal processor and a retract mechanism to retract the actuator when the spindle motor speed is unexpectedly much higher or lower than normal speed. The system DSP (Digital Signal Processor) is unaware of such occurrence.

14 Claims, 5 Drawing Sheets

INTELLIGENT SPEED MONITORING AUTO RETRACT SYSTEM

This patent application claims priority from U.S. Provisional application No. 60/130,304, filed Apr. 21, 1999.

FIELD OF INVENTION

The present invention relates generally to regulation of the speed of a spindle motor in a disc drive, and more particularly to a hardware based dedicated circuit to ensure that the heads on the actuator arm retract to the landing zone on the occurrence of an unexpected over speed or under speed of the spindle motor.

BACKGROUND OF THE INVENTION

In a typical disc drive, there is one or more discs mounted on a spindle. The disc surface is divided into concentric tracks where data can be stored. Both sided of a disc provide for data storage. When data is to be retrieved or stored, a read/write head is used. The read/write head is mounted on a finger, which is in turn mounted on to the end of an actuator arm. The number of read/write heads is double of the total number of discs in a disc drive. The spindle is driven by the spindle motor to rotate the discs. The actuator arm is driven by VCM (Voice Coil Motor) to pivotally position the head over the disc surface such that it flies over the disc surface above a thin layer of air during operation. The read/write head and the disc surface are kept apart by the air bearing between them. When the spindle speed slows down such that the air bearing can not be sustained, the read/write head will tend to crash into and drag along the surface. This will cause permanent damage to the disc surface. Such situations usually occur during spindle start-up and spindle turn-off.

All modern disc drives have some means of preventing a read/write head of an actuator from crashing into the disc surface when there is either an intentional or emergency power shut-down. Actuators are typically moved to a non-data storage area on the disc surface during a power shut-down. Such an area on the disc surface is known as the landing zone where the actuator is parked when there is no read/write operation.

U.S. Pat. No. 4,371,903 issued on Feb. 1, 1983 to DMA Systems Corporation entitled "EMERGENCY HEAD RETRACT SYSTEM FOR MAGNETIC DISC DRIVES", U.S. Pat. No. 4,786,995 issued on Nov. 22, 1988 and U.S. Pat. No. 4,866,554 issued on Sep. 12, 1989 to Peripheral Technologies, Inc. both entitled "AUTOMATIC HEAD RETRACT SYSTEM" teach how the problem of damage to the disc drive surface can be minimized.

U.S. Pat. No. 4,371,903 provides an electrical circuit with a switch means which is operatively positioned between the stator winding of a magnetic DC motor and a linear motor positioner coil (also known as Voice Coil). The magnetic DC motor is used as the spindle motor during normal operation. When an emergency situation arise, the switch means will couple the coil to the stator windings and relay means responsive to the emergency situation where the kinetic energy from the spindle mass is used to unload the read/write head.

U.S. Pat. No. 4,786,995 and U.S. Pat. No. 4,866,554 provide a latching system to retract the read/write head to the landing zone in response to electric power turn off (whether intentional or attributable to an emergency condition involving electric power loss). The read/write head is automatically retracted by operating the positioner motor (also known as the Voice Coil Motor) under the control of logic within the disc drive unit so as to control the speed of the carriage to avoid high speed crashing against its travel limit.

The means of managing retract of the read/write head are taught in the prior art mentioned above. In these prior art, the retract of the read/write head is in response to a power loss or an emergency situation. However, there is another aspect that would lead to the read/write head crashing into the disc surface. This involves the risk of abnormalities in the speed of the spindle motor. Such abnormalities are caused by the unexpected over or under speed of the spindle motor.

In the latest generation of disc drives, the spindle speed is regulated by the servo processor, which also controls the actuator. There are situations where the servo processor unexpectedly stops monitoring and controlling the spindle speed. These abnormalities may occur when the processor gets stuck in a loop or when the processor unexpectedly moves to a state where it expects not to have to monitor the spindle speed. The occurrence of such abnormalities increase as the code driving these processors becomes more complex. When spindle speed regulation is lost, the spindle speed invariably increases or decreases beyond a reasonable range. Early detection of abnormalities in the spindle speed has been used such that action may be taken to prevent the head from crashing into the disc surface by moving the actuator to the landing zone. U.S. Pat. No. 4,807,062 issued Feb. 21, 1989 to Kabushiki Kaisha Toshiba, entitled "MULTIPLE FORCE RETRACT CIRCUIT FOR A MAGNETIC DISC DRIVE" describes a magnetic disc drive which provides for the magnetic head to move to the landing zone under abnormal conditions of the spindle motor. The magnetic disc drive has an abnormality detection means for detecting whether the drive is in an abnormal condition, a position detection circuit for detecting whether the magnetic head is at the landing zone, a control means and drive means to move the magnetic head, if it is not already at the landing zone. A microprocessor and many other elements in the whole circuit are used to ensure that the actuator is parked at the landing zone when abnormality arises.

There remain a need for an improved method to detect abnormalities of the spindle speed such that the servo processor recover from such situations even if it were in a loop or in an unexpected state.

There is also a need for a simple retract circuit for moving the actuator arm to the "landing zone" during abnormalities in the spindle speed where the servo processor is interrupted by a hardware mechanism to reset the servo processor to a known state. From such a known state, to servo processor should then be able to sense the spindle speed and lock to he spindle speed for speed regulation, or failing which, it should be able to brake the spindle and restart the power up procedure to restore spindle control. This will be a graceful way of recovering from an unexpected situation where spindle speed regulation is lost, and the servo processor is not aware of the loss of spindle speed regulation. It will be evident from the following description that the present invention offers this and other advantages.

SUMMARY OF THE INVENTION

The present invention is directed to minimize the above-mentioned problems with an improved retract system for an actuator in a disc drive. The actuator is retracted when spindle motor is under speed or over speed. According to the present invention, there is provided a disc drive with The present invention provides a check of the spindle speed to minimize abnormalities in addition to the sudden slowing down or speeding up of the spindle speed either in an intentional and emergency power turn-off. Abnormalities are detected by setting a fixed range for comparing to the spindle motor speed of an operating disc drive such that a spindle motor will function without causing the read/write head to crash into the disc drive surface within that range.

The present invention can also be implemented in a disc drive a disc on a spindle, such that the spindle is rotatably driven by a motor at a spindle speed monitored by a frequency sensor. The disc drive also has a head for reading and writing data on a surface of the disc. The head being suspended from an actuator arm over the disc which is driven by a voice coil motor. The disc drive includes a retract device that has a comparator circuit to compare input signal from the frequency sensor with a predefined threshold range and outputs a comparison signal when the input signal falls outside of the predefined threshold range. The retract device also includes a delay filter which determine a duration of the comparator signal. A trigger initiates a retract mechanism when the comparison signal falls outside of the predefined threshold range for a predetermined duration of time. The retract mechanism being configured to move the head away from the surface of the disc.

The retract device has a comparator system to compare input signal from the frequency device with a predefined threshold range. There is also a delay filter to determine signal duration from the comparator system. A trigger is also included to initiate a retract mechanism when there is a resultant signal from the delay filter.

In another aspect of the present invention, the retract device having a circuit with a frequency-voltage converter, a comparator system, a delay filter and a trigger. The frequency-voltage converter in the circuit converts input frequency to voltage output to the comparator system where the voltage is compared with a predefined higher and lower threshold voltage range. The delay filter determines if the duration of the voltage supply from the comparator system is significant to be considered as an abnormality. This is achieved by comparing the duration of the voltage supply with a predefined threshold value set in the delay filter. If the duration of the voltage supply exceed the predefined threshold value, the voltage from the delay filter will simultaneously interrupt a processor and initiate a retract mechanism through the trigger.

In another embodiment of the present invention, the comparator system in the circuit has two comparators to determine if the voltage is within the threshold range; where one comparator is set at a higher threshold value and the other is set at a lower threshold value. To facilitate such a comparison, the voltage output from the frequency-voltage converter split into the two comparators. In order to obtain a single resultant output, an OR gate is incorporated into the comparator system to link the two comparators.

In another embodiment of the present invention, a low pass filter is used to provide a time delay as part of the delay filter. The low pass is made up of a resistor and a capacitor. There is also a fast discharge path linked to the OR gate of the comparator system during a low output. A third comparator, set at a predefined threshold value, is used to provide an adjustable delay value in the delay filter. It is preferred that the delay filter includes an AND logic gate to provide a single resultant output from the third comparator and the OR gate.

In yet another embodiment of the present invention, the signal processor is reset to a known state following the interruption such that it is enabled to restart the power-up procedure to restore spindle control.

In the present invention, the retract mechanism is initiated to enable the actuator to return to the landing zone.

One advantage of the present invention is that it is able to initiate two actions at the same time with a single resultant from a two-step process.

Another advantage of the present invention is that it provides a filter of non-genuine abnormalities like noise disturbances.

These and various other features as well as advantages which characterize the present invention will be apparent upon reading of the following detailed description and review of the associated drawings.

DETAILED DESCRIPTION

Figure 1:
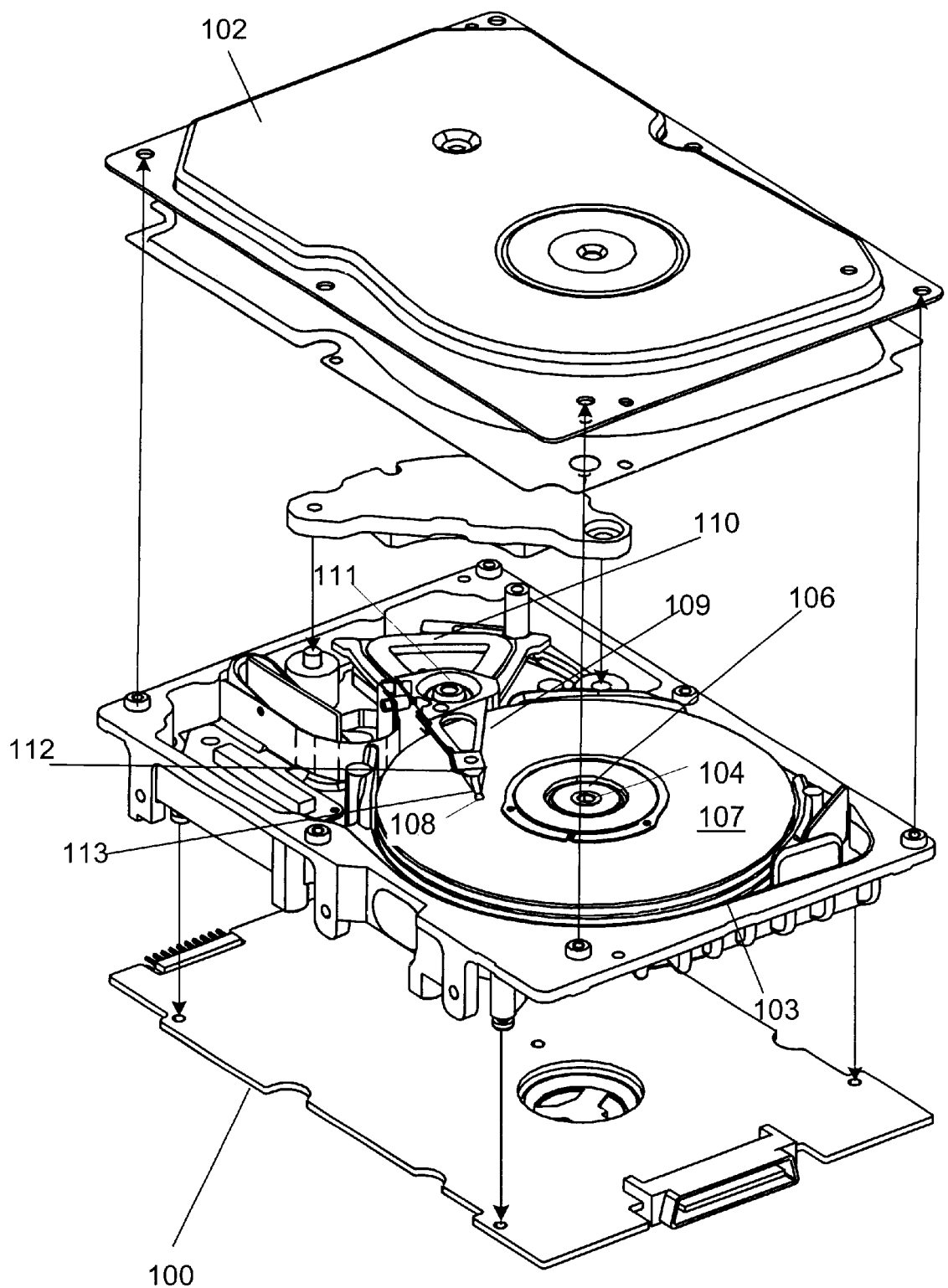
FIG. 1 is disc drive in which the present invention is applied.

FIG. 1 shows an exemplary disc drive such as one in which the present invention may be implemented. A base 100 and a cover 102 form an enclosure for the various components in the disc drive. The components include one or more disc 103 that are rotatably mounted on a spindle 104 which is driven by a spindle motor 106. Data is stored on the disc surfaces 107 which are arranged in concentric tracks. A read/write head 8 mounted on an actuator 109 flies over the disc surface 107 with a very thin layer of air in between. The actuator 109 is controlled by a VCM (voice coil motor) 110 about a pivot 111. The actuator 109 includes one or more actuator arm 112. Each actuator arm 112 is connected to at least one suspension 113. The read/write head 108 is supported at the end of the suspension 113. The actuator 109 can be rotated to position the read/write head 108 over the desired track on the disc surface 107 for read/write operations. The speed of the spindle motor 106 controls the rate at which the disc 103 rotates.

Figure 2:
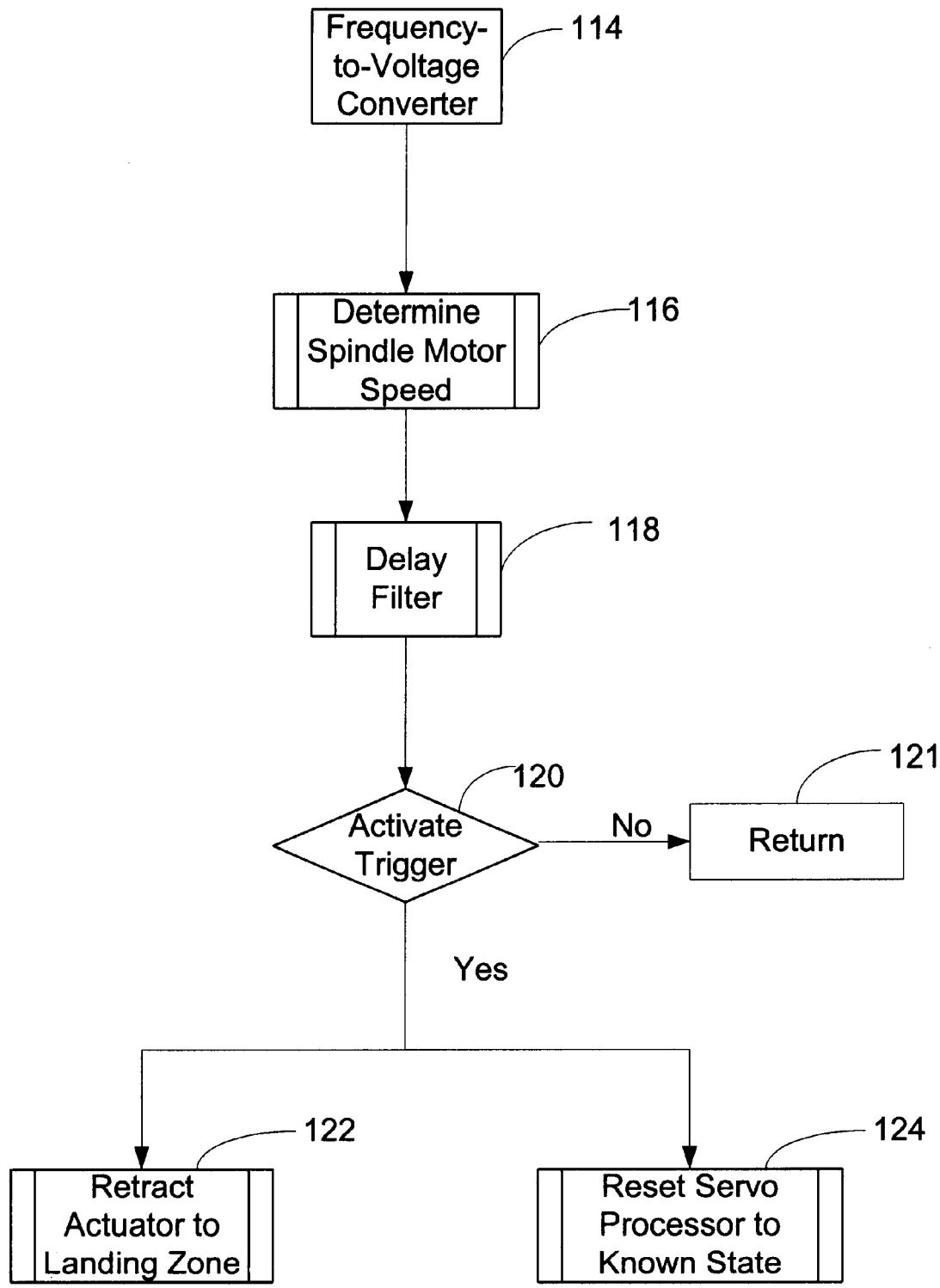
FIG. 2 is a flow diagram of the process provided by the present invention.
Figures 3, 4:
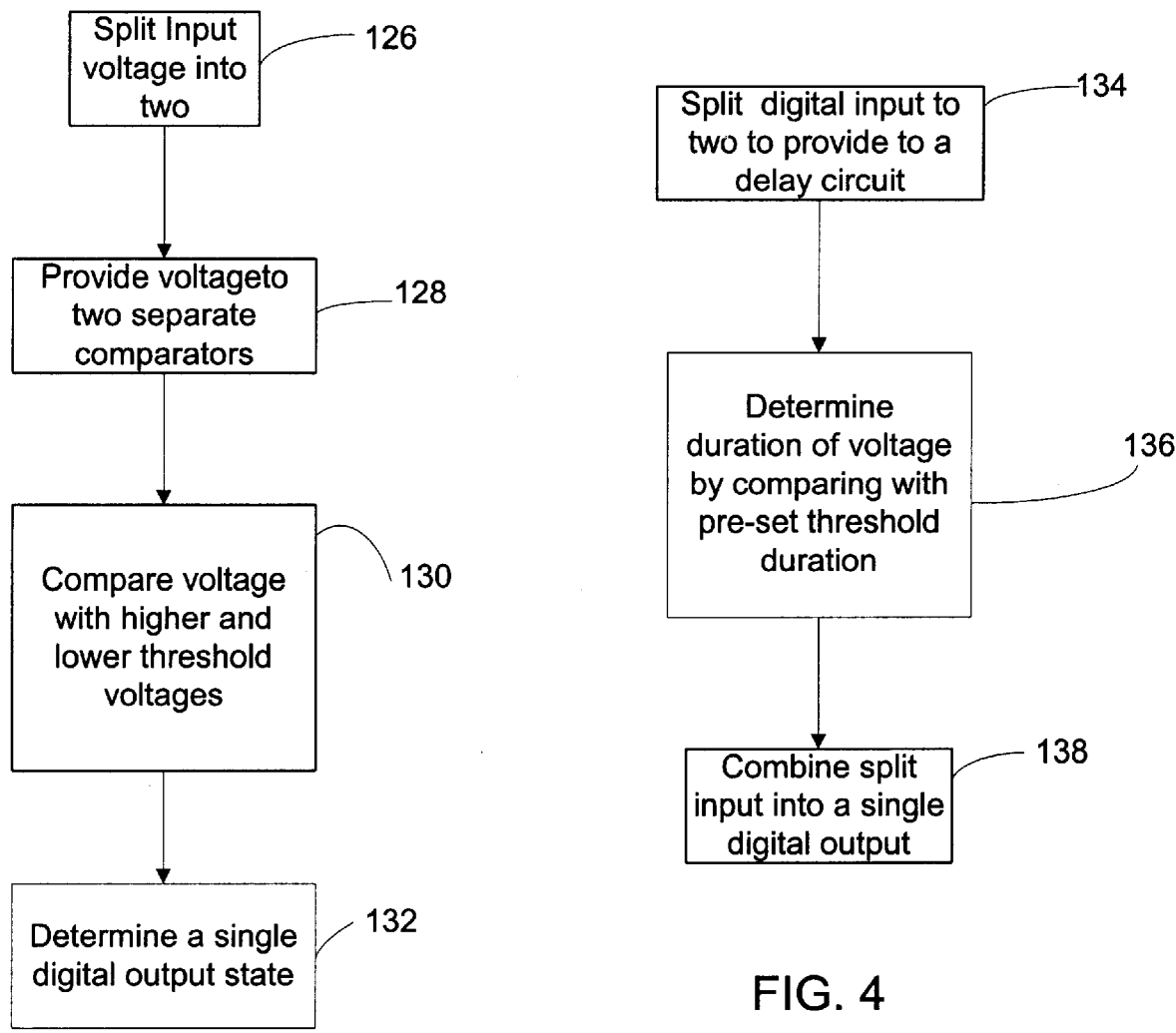
FIG. 3 is a flow diagram of one of the pre-defined process illustrated in FIG. 2.
FIG. 4 is a flow diagram of one of the predefined process illustrated in FIG. 2.

FIG. 2 to FIG. 4 illustrates the process of the most preferred embodiment of the present invention.

FIG. 2 shows the process in which the present invention provides. The present invention provides for an input frequency of the spindle motor speed to a frequency-to-voltage converter 114. The output voltage from 114 is then compared to a fixed range of voltage threshold to determine if the spindle motor is over speed or under speed in the pre-defined process 116. Abnormalities would arise, if there is an over speed or under speed. The output from 116 will be fed to another predefined process 118 where the duration of the voltage output from 114 will be monitored. If the duration of the voltage output from 114 is less than a certain pre-defined time, the abnormality will not be considered and the trigger 120 will not be activated. The trigger 120 is triggered when the spindle over speed or under speed for a significant duration. Once the trigger 120 is activated, the actuator will be retracted 122 to the landing zone and the servo will be reset to a known state 124.

FIG. 3 further illustrates the pre-defined process 116. The voltage from 114 is split to two 126. The split voltage is then fed to two comparators 128 and compared to a higher and a lower threshold voltage 130. At each comparator, the resultant digital output state is determined and the outputs are fed through an OR gate to provide a single resultant output at 132. The digital output at 132 may be a high state or a low state depending on the speed of the spindle motor.

FIG. 4 further illustrates the pre-defined process 118. The resultant output from 132 is split into two at 134 and fed to a delay filter 136. The resultant from the delay filter at 136 is then fed to an AND gate at 138 to determine the resultant digital output. The delay filter monitors the duration of the spindle speed by comparing to a predefined threshold duration. The resultant output is than combined through the AND gate 138. The resultant from the AND gate 138 is then fed to 120.

Figure 5:
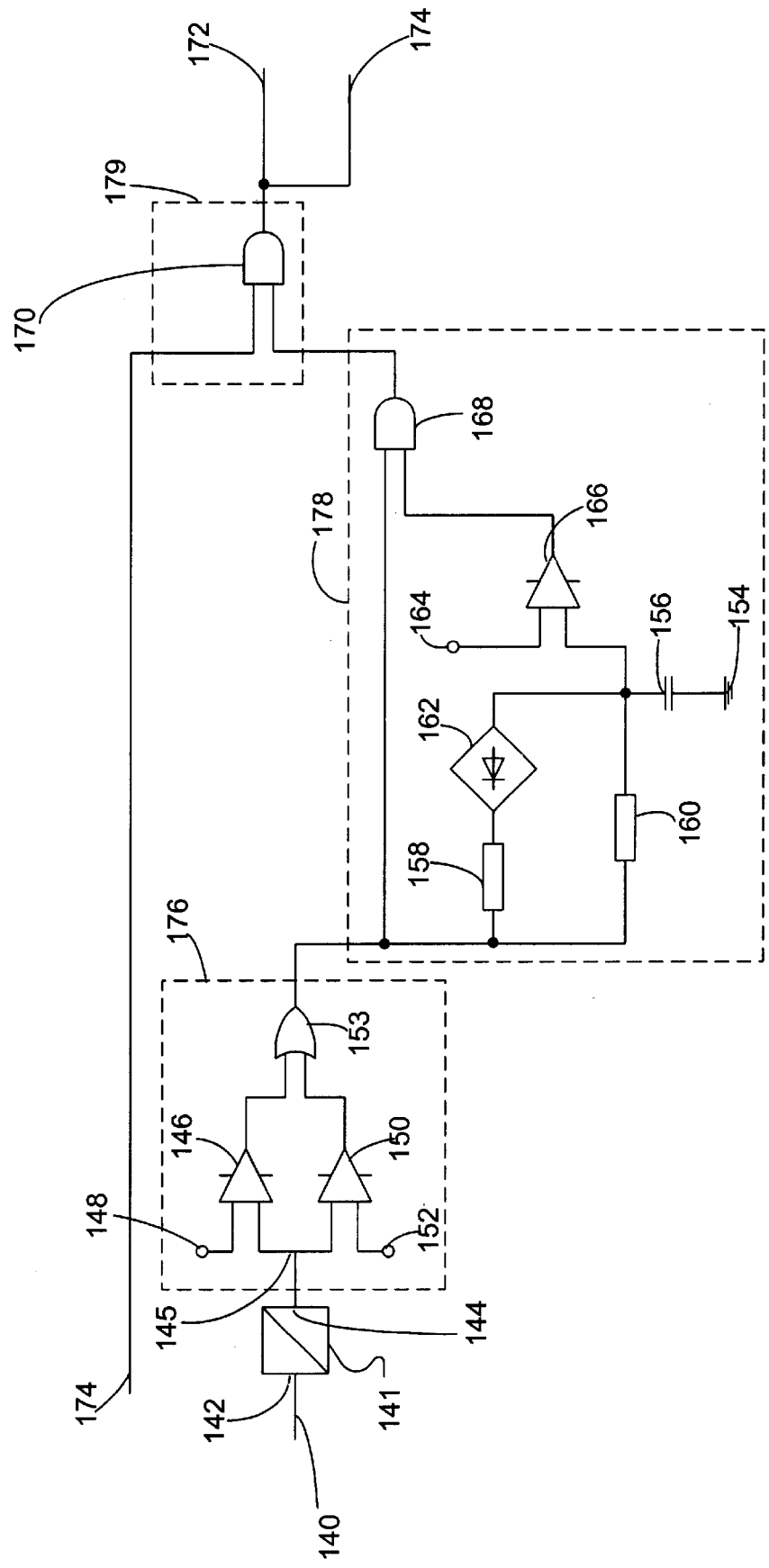
FIG. 5 is a circuit layout of one of the embodiments of the present invention.

The most preferred embodiment of the present invention is a circuit illustrated in FIG. 5 where an output generated based on the back EMF (Electromotive Force) of the three phase spindle motor is used to monitor the speed of the spindle motor. The frequency of the TACH (Tachometer) output 140 is proportional to the speed of the spindle motor. The higher the speed of the motor, the higher the frequency at the TACH output 140. This output 140 is provided as frequency input 142 to a frequency-to-voltage converter 141. This frequency input 142 is then converted to voltage output 144 in the frequency-voltage converter 41 and is used to monitor the spindle TACH feedback output. The voltage output 144 is fed to a comparator system 176 which consist of a pair of comparators 146 and 150 to trigger a retract whenever a lower or higher speed threshold is breached. In order to minimize the risk of the read/write head crashing into the disc drive surface, the speed of the spindle motor is allowed to vary over a small range between S1 and S2. This sets the normal speed conditions which the disc drive will operate without glitches. S1 is the lower threshold frequency and S2 is the higher threshold frequency. These frequency threshold values are directly proportional to the speed of the spindle motor. When there is a variation in speed below S1 rpm (revolutions per minute) or above S2 rpm, and the duration is longer than x seconds, the circuit provides a trigger 179 to interrupt the DSP (Digital Signal Processor) 174 as well as to the retract pin at 172 of the motor driver. The retract trigger consist of an AND gate 170 and is qualified by a bit written to the spindle driver register by an output port 174 to enable or disable the retraction. This is for times when the circuit should not be enabled, such as spin-up, and when the drive is actually commanded to slow down. Thus, the circuit will only be activated when the DSP 174 does not expect the spindle to spin down, and will only be triggered when there is an unexpected over speed or under speed occurrence. The triggered retract pin will force a hardware retract of the actuator to the landing zone. The interruption of the DSP 174 informs the DSP 174 of an unexpected retract occurrence, and thus allow the DSP 174 to recover gracefully. At normal speed conditions, if there is a sudden change of motor speed less than x seconds, the circuit will not trigger. This is to ensure that the VCM (Voice Coil Motor) will not retract due to false trigger.

According to FIG. 5, when the spindle motor speed is below S1 rpm, it will manifest as a lower VCO (Voltage Controlled Oscillator) frequency (above F1 Hz (Hertz)) at the TACH output 140. This frequency change is converted to voltage by the frequency to voltage converter 141. The voltage 144 is compared with the threshold voltages of the pair of comparators, 146 and 150. The threshold voltages in each comparator can be set via resistor ratio. The threshold of comparator 146 is set at T1 V (volts), which is equivalent to S1 rpm. Any voltage below this shall trigger the comparator 146. The triggered comparator 146 will output a high state to the OR gate 153, which in-turn present a high state to the delay filter circuit 178.

When the spindle motor speed is above S2 rpm, it will manifest as higher VCO frequency (F2 Hz) at the TACH output 140. This frequency change is converted to voltage 144 by the frequency-to-voltage converter 141. The threshold of comparator 150 is set at T2 V, which is equivalent to S2 rpm. Any voltage above this shall trigger the comparator 150. The voltage 144 is then compared with the thresholds of comparator 150. This time, comparator 150 is activated and outputs a high state to the OR gate 153, which in-turn presents a high state to the delay filter circuit 178.

During normal conditions, the speed of the spindle motor will fall within the range of S1 and S2. This means that the voltage output T V at 144 from the frequency-to voltage converter 141, will be higher than T1 V and lower than T2 V. Therefore the output from the 2 comparators, 146 and 150, will be at low states to the OR gate 153, which in-turn presents a low state to the delay filter circuit 178.

All other conditions will result in a high state output to the delay filter through the OR gate 153.

The delay filter circuit 178 consists of a low pass filter, a fast discharge path made up of a diode 162 and a resistor 158 and a comparator 166. The low pass filter provides a time delay with a resistor 160 and a capacitor 156. The voltage on the capacitor 156 will discharge rapidly through the diode 162 during the time when the OR gate 153 output is held low. This is to prevent accumulation of charges on the capacitor 156. The threshold setting, T3 V for the comparator 166 is to provide an adjustable delay value setting. The delay filter circuit 178 will monitor the output of the OR gate 153 for x seconds during which the output of OR gate 153 will have to stay high before the delay filter will send out a trigger to be qualified by the AND gate 168. If the output of the OR gate 153 drops low during the x seconds delay period, the delay period will be reset through the diode 162 until the next occurrence of the output of OR gate 153 going high. This is to ensure that the variation is genuine and sustained, and not due to spurious noise disturbances or during spin down occurrences. Hence, at normal speed condition, if there is a speed glitch of less than x seconds, there will be no trigger as the diode 162 will set the capacitor 156 to discharge mode through a ground 154 and hence will not be qualified by the threshold T3.

When the output from the OR gate 153 is a high state, the output at the AND gate 168 may be a high state or a low state. The high or low state of AND gate 168 depends on whether the change of speed of the spindle motor is longer that the duration set by the threshold T3 at comparator 166.

When the output from the OR gate 153 is a low state, the output at the AND gate 168 will always be at a low state.

The output of the delay at AND gate 168 is qualified with the output port enabled bit, at the AND gate 170 when fed to the trigger 179. The qualified output of the AND gate 170 will interrupt the DSP 174 and activate the retract pin of the motor driver. When the output from the AND gate 168 is a low state while the output port is enabled, the output at AND gate 170 will be a low state and vice versa.

Figure 6:
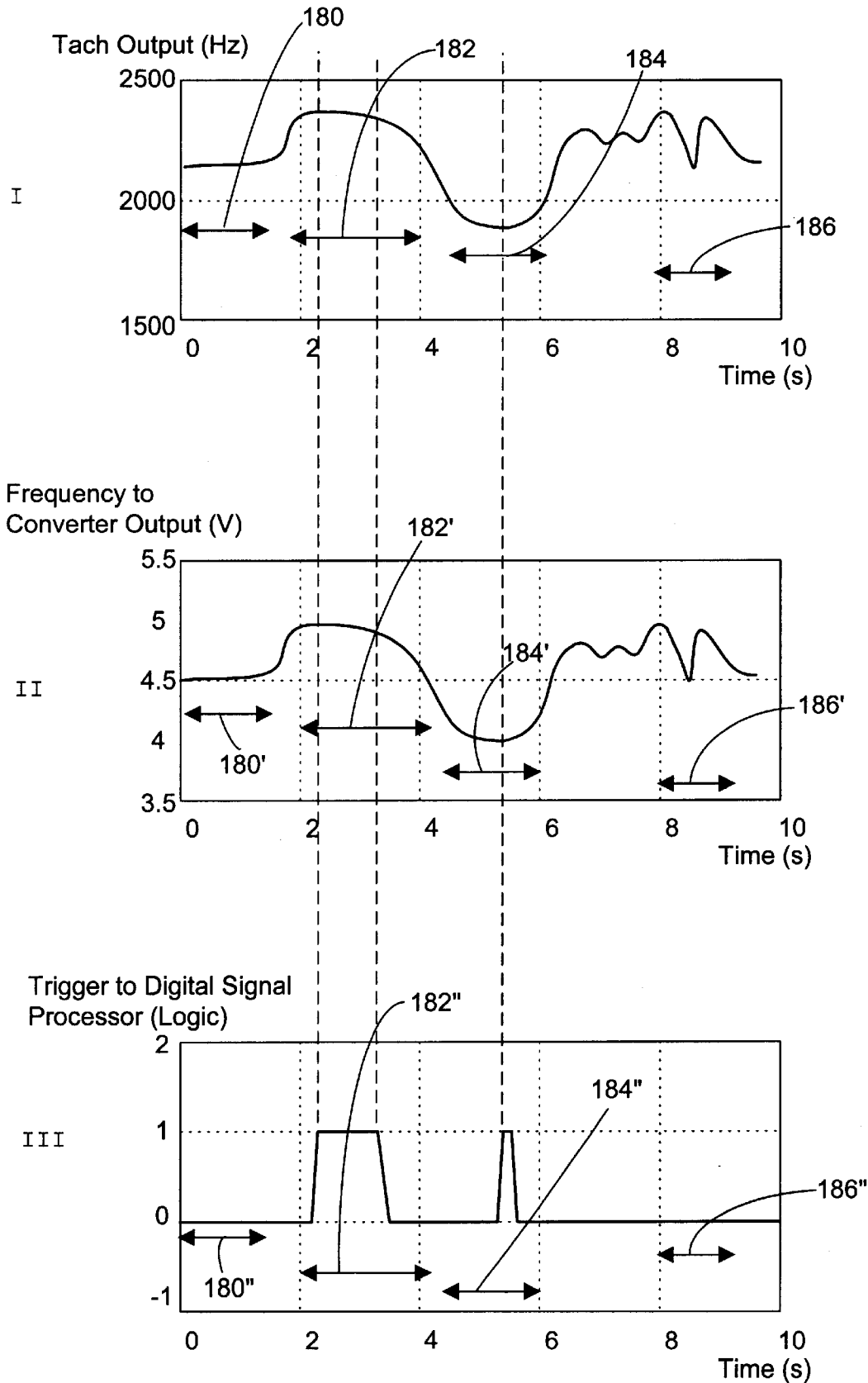
FIG. 6 is a graphical illustration of how the present invention works.

FIG. 6 illustrates a simulation on the circuit of the above-mentioned embodiment. In this simulation, the range in which the disc drive will operate without risk of the read/write head crashing into the disc surface is set between S1=6800 rpm (TACH=5670 Hz), higher threshold limit and S2=7800 rpm (TACH=1980 Hz), lower threshold limit. The delay duration is set at 0.6 seconds and the threshold value at T3 is 0.6 V while R1=600 K, R2=80 K, C1=2 u. Various stages of the simulation result are shown in FIG. 6. The values 180', 182', 184' and 186' of the TACH inputs VCO (Voltage Controlled Oscillator) frequencies are shown in I. The voltages 180', 182', 184' and 186' from the frequency-to-voltage 41 are shown in 11. The resultant trigger outputs 180", 182", 184" and 186" from AND gate 170 shown in III. These are the corresponding values in four cases: normal speed 180, 180' and 180"; over speed 182, 182' and 182"; under speed 184, 184' and 184"; and sudden change of speed but less than 0.6 seconds 186, 186' and 186". From III, two triggers (i.e. high state 1) are observed. The first trigger is due to over speed of the spindle motor while the second trigger is due to under speed of the spindle motor. These will in turn trigger the retract pin and the DSP (Digital Signal Processor) to force retract of the VCM. The other two trigger values are at a low state 0 as expected. At normal speed of the spindle motor no trigger will occur and the disc drive will operate as per normal. While the other low state is due to a glitch which held at a duration that is below the set threshold of 0.6 seconds.

The above embodiment can be implemented as an ASIC (part in motor driver IC (INTEGRATED CIRCUIT). The IC shall have extra two pins, one input pin for external output port enable and the other for the trigger output. In addition, three registers shall be added for two threshold voltage settings and the time delay settings.

In summary, a disc drive having a disc 103 on a spindle 104, such that the spindle 104 is rotatably driven by a motor at a spindle speed monitored by a frequency sensor. The disc drive also has a head 108 for reading and writing data on a surface 107 of the disc 103, the head 108 being suspended from an actuator arm over the disc 103 which is driven by a voice coil motor 110. The disc drive includes a retract device that has a comparator circuit 176 to compare input signal from the frequency sensor with a predefined threshold range and outputs a comparison signal when the input signal falls outside of the predefined threshold range. The retract device also includes a delay filter 178 which determine a duration of the comparator signal. A trigger 179 initiates a retract mechanism when the comparison signal falls outside of the predefined threshold range for a predetermined duration of time, the retract mechanism being configured to move the head away from the surface of the disc.

In a disc drive, a circuit with a frequency-voltage converter 141; a pair of comparators, 146 and 150, to compare an input voltage 144 with a higher and lower threshold range; a delay filter 178 to determine the length of time the input voltage last; and a AND gate 170 to interrupt a processor as well as to initiate a retract mechanism such that the actuator is brought to the landing zone. The frequency-voltage converter 141 is connected to the pair of comparators, 146 and 150 such that the input voltage 144 is provided to the comparators, 146 and 150. The 2 comparators, 146 and 150, provides an output voltage to the delay filter 178. The delay filter 178 is connected to the AND gate 170 where the output from the AND gate 170 is split into two.

The first comparator 146 is to determine and compare the output voltage 144 from the frequency-voltage converter 141 with the higher threshold voltage. The second comparator 150 is to determine and compare the output voitage 144 from the frequency-voltage converter 141 with the lower threshold voltage. The OR logic gate 153 to provide a single resultant voltage output from the first comparator 146 and second comparator 150.

The delay filter 178 has a low pass filter to provide a time delay; a fast discharge path during a low output from the OR gate 153; the third comparator 166 to provide an adjustable delay value; and a AND logic gate 168 to provide a single voltage output from the third comparator 166 and the OR logic gate 153. The low pass filter is made up of a resistor 160 and a capacitor 156. The third comparator 166 is set at a predefined threshold voltage.

A disc drive having at least one disc on a spindle motor, an actuator and means to return the actuator to the landing zone when the speed of there is an over speed or under speed of the spindle motor.

The foregoing description is only illustrative of various embodiments of the invention, and a person skilled in the art will understand that changes can be made to the details of structure, function and processes without going beyond the scope of the present invention.

What is claimed is:

1. A disc drive having:
   a disc mounted on a spindle, the spindle being rotatably driven by a motor at a spindle speed, the spindle speed being monitored by a frequency sensor;
   a head for reading and writing data on a surface of the disc, the head being suspended from an actuator arm over the disc; and
   a retract device comprising:
      a comparator circuit which compares an input signal from the frequency sensor with a predefined threshold range and outputs a comparison signal when the input signal falls outside of the predefined threshold range;
      a delay filter which determines a duration of the comparison signal; and
      a trigger, operatively coupled to the comparator circuit and the delay filter, which initiates a retract mechanism when the comparison signal falls outside of the predefined threshold range for a predetermined duration of time, the retract mechanism being configured to move the head away from the surface of the disc.

2. The disc drive according to claim 1, wherein the retract device further comprises a frequency-voltage converter to convert the input signal from frequency to voltage output.

3. The device according to claim 2, wherein the voltage output is split into two.

4. The device according to claim 3, wherein the comparator circuit further comprises:
   a first comparator to compare the output voltage from the frequency-voltage converter with a predefined higher threshold voltage;
   a second comparator to compare the output voltage from the frequency-voltage converter with a predefined lower threshold voltage; and
   an OR logic gate to provide a resultant output of voltage from the first comparator and second comparator as the comparison signal.

5. The device according to claim 1, wherein the delay filter further comprises:
   a low pass filter to provide a time delay;
   a fast discharge path during a low output from the OR gate;
   a third comparator to provide an adjustable delay value; and
   an AND logic gate to provide a resultant output from the third comparator and the AND logic gate.

6. The device according to claim 5, wherein the low pass filter further includes a resistor and a capacitor.

7. The device according to claim 5, wherein the third comparator is set at a predefined threshold voltage.

8. The disc drive according to claim 1, wherein the trigger of the retract device interrupts the processor in the disc drive when the retract mechanism is initiated.

9. The disc drive according to claim 1, wherein the retract mechanism disrupts a voice coil motor and moves the actuator to a landing zone.

10. A disc drive having:

a disc with a landing mounted on a spindle motor;

an actuator arm connected to a head; and means for returning the head to the landing when a speed of the spindle motor falls out of a predetermined range.

11. A method of retracting an actuator comprising the steps of:

comparing a motor speed to a range; and retracting the actuator if the motor speed is outside the range.

12. The method of claim 11 wherein first and second values define the range, the step of comparing includes comparing the motor speed to the first and second values and the step of retracting occurs if the motor speed is less than the first value or greater than the second value.

13. A disc drive comprising:

a disc rotatable by a spindle motor; and an actuator arm connected to a head, wherein a spindle motor speed is compared to a range and, if the spindle motor speed is outside that range, the actuator arm is retracted.

14. The disc drive of claim 13 wherein the range is defined by first and second values, the spindle motor speed is compared to the first and second values, and the actuator arm is retracted if the spindle motor speed is less than the first value or greater than the second value.

* * * * *